United States Patent     [11] 3,624,260

| [72] | Inventor | Donald J. Peterson<br>Cincinnati, Ohio |
|---|---|---|
| [21] | Appl. No. | 4,020 |
| [22] | Filed | Jan. 19, 1970 |
| [45] | Patented | Nov. 30, 1971 |
| [73] | Assignee | The Procter & Gamble Company<br>Cincinnati, Ohio<br>Original application Mar. 13, 1967, Ser. No. 622,419, now Patent No. 3,502,731. Divided and this application Jan. 19, 1970, Ser. No. 4,020 |

[54] NOVEL PHOSPHORUS AND SULFUR CONTAINING COMPOUNDS AND PROCESS FOR PREPARING SAME
7 Claims, No Drawings

[52] U.S. Cl. .................................................. 260/606.5 P,
252/49.8, 252/161
[51] Int. Cl. .......................................................... C07f 9/50,
C10m 1/46, C11d 9/34

[50] Field of Search ............................................. 260/606.5 P

[56] References Cited
UNITED STATES PATENTS

| 3,306,937 | 2/1967 | Clampitt et al. ............... | 260/606.5 P |
|---|---|---|---|
| 3,404,187 | 10/1968 | Koben et al. ................... | 260/606.5 P |
| 3,414,624 | 12/1968 | Peterson et al. ............... | 260/606.5 P |

*Primary Examiner*—Tobias E. Levow
*Assistant Examiner*—Werten F. W. Bellamy
*Attorneys*—Louis G. Xiarhos and Jack D. Schaeffer ABSTRACT: Alkylthiomethylmetal compounds prepared by reacting alkyl methyl sulfides with potent metalating agents, e.g., a complex between alkyllithium compounds and alkylenediamines; alkyl- or phenylsodium; or alkyl- or phenylpotassium; (2) the reactions of the alkylthiomethylmetal compounds with trialkyl- and triarylphosphites, mono- and dihalo and trihalo and pseudohaloalkyl- and arylphosphines, and (3) new compounds produced thereby containing phosphorous and sulfur.

1

NOVEL PHOSPHORUS AND SULFUR CONTAINING COMPOUNDS AND PROCESS FOR PREPARING SAME

CROSS-REFERENCE TO RELATED APPLICATIONS

This application is a division of U.S. Pat. application Ser. No. 622,419, filed Mar. 13, 1967, and now U.S. Pat. No. 3,502,731 entitled Alkylthiomethylmetal Compounds, Preparation Thereof, and Reactions Thereof, in the name of Donald J. Peterson.

BACKGROUND OF THE INVENTION

This invention relates in part to alkyl methyl sulfide derivatives. Specifically this invention relates to alkylthiomethylmetal compounds useful in the synthesis of carbon-substituted organosulfur compounds. This invention also relates to methods of preparing alkylthiomethylmetal compounds, processes utilizing said compounds, and new compounds produced by said processes.

The sulfide group, or thioether linkage, is a very useful group to have in a compound. For example, the sulfide group can be readily oxidized to form the more hydrophilic sulfoxide group and/or a sulfone group and can be reacted with e.g., an alkyl halide or pseudohalide to form the corresponding sulfonium salts.

In U.S. Pat. 3,228,860, it was disclosed that a sulfoxide group would activate a hydrogen atom attached to an adjacent carbon atom sufficiently to permit the metalation of said carbon atom. Also, Corey and Seebach, *J. Org. Chem.*, 31, 4097 (1966) and Gilman and Webb *J. Am. Chem. Soc.*, 62, 987 (1940) have reported the preparation of phenylthiomethyllithium. However, until the present invention, it had not been shown that one could metalate a carbon atom when the only activating group present in the compound to be metalated was an alkylthio group.

SUMMARY

This invention relates primarily to the discovery that it is possible to prepare alkylthiomethylmetal compounds by reacting an alkyl methyl sulfide compound having the formula:

$$RSCH_3$$

wherein R is a saturated alkyl group containing from one to 30 carbon atoms, from zero to 10 substituent oxygen atoms replacing methylene groups in alkyl and alkylene groups, and from zero to two substituents selected from the group consisting of aryl groups, alkaryl groups, and tertiary amino groups, said substituents being placed so that no aryl moiety, oxygen atom, or nitrogen atom is attached to any carbon atom which is less than three atoms removed from the sulfur atom
  with a metalating agent selected from the group consisting of (1) phenylsodium (2) phenylpotassium (3) alkylsodium wherein the alkyl group contains from one to 20 carbon atoms and is attached to the sodium through a primary carbon atom, (4) alkylpotassium wherein the alkyl group contains from one to 20 carbon atoms and is attached to the potassium through a primary carbon atom, and (5) a complex of an alkyllithium wherein said alkyl group contains from one to about 20 carbon atoms with an amino compound selected from the group consisting of compounds having the formula $(R^1)_2NR^2N(R^1)_2$ wherein each $R^1$ group is a saturated alkyl group containing from one to about 20 carbon atoms and wherein $R^2$ is a saturated alkylene group containing from one to five carbon atoms and wherein the total number of carbon atoms in said amino compound is from five to about 28 carbon atoms and diazabicyclo (2.2.2) octane
said reaction taking place in an inert atmosphere at a temperature of from about −60° C. to about 100° C. and in a solvent which is either an excess of the alkyl methyl sulfide or a saturated hydrocarbon containing from about five to about 12 carbon atoms.

The alkyl methyl sulfide compounds which react with the potent metalating agents to form the alkylthiomethylmetal compounds are characterized by the absence of any substituent aryl group, oxygen atom or nitrogen atom on either of the two carbon atoms nearest the sulfur atom in the alkyl group. It has been found, surprisingly, that a hydrogen atom in the methyl group of such a compound is sufficiently activated so that the potent metalating agents hereinbefore described can remove said hydrogen atom to form the novel alkylthiomethylmetal compounds of this invention:

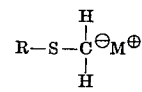

wherein M is an alkali metal, e.g., sodium, potassium or lithium.

THE ALKYL METHYL SULFIDE

Suitable R groups include both unsubstituted saturated alkyl hydrocarbon groups and substituted alkyl groups containing, for example, oxygen substituents replacing methylene groups and substituent tertiary amino groups. Preferably, the R group in the formulas above and below is an alkyl group (straight, cyclic, or branched) containing from one to about 20 carbon atoms (e.g., methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl), and cyclooctyl groups. The preferred alkyl group is methyl and the preferred alkyl methyl sulfide is dimethyl sulfide.

Examples of other saturated hydrocarbon groups include groups containing up to two substituent aryl groups, e.g., phenyl, biphenyl, or naphthyl groups and branched or straight alkyl and/or alkylene groups of from one to about 14 carbon atoms (e.g., 3-phenyl-dodecyl, 4-methyl, 4-phenyloctyl, 4-phenyltetradecyl, 3-(1-naphthylbutyl), 4-(1-naphthylbutyl), 3-(4-biphenyl)pentyl, and 3-(4-biphenyl)propyl groups.

The presence of certain relatively nonreactive groups, as hereinbefore described, in or on the R groups is permissible. As an example of relatively nonreactive substituents, the R group can contain up to about 10 oxygen atoms replacing methylene groups in alkyl or alkylene groups or up to two tertiary amino groups. Thus R can represent, for example, such groups as 4,7,10-trioxaeicosyl, 3-dodecoxypropyl, 3-octadecoxypropyl 3-methoxypropyl, 4-ethoxybutyl, 6-hexoxyhexyl, 3-octoxyheptyl, 11-methoxyundecyl, 11-ethoxyundecyl, 9-methoxyoctadecyl, 10-ethoxyoctadecyl, 3-methoxycyclohexyl, 3-cyclohexyloxydecyl, 4,7-dioxaheptadecyl, 3-dimethylaminopropyl, 3,6-di(diethylamino)-hexyl, and 3-diethylaminopropyl groups.

(R groups, once defined, have the same definitions throughout the specification and claims.)

The preferred alkyl methyl sulfide starting compound is dimethyl sulfide because it undergoes the aforesaid reaction with remarkable facility and dimethyl sulfide is readily available.

Other preferred alkyl methyl sulfide starting compounds are alkyl methyl sulfides wherein the alkyl groups contain from two to about 20 carbon atoms (e.g., dodecyl methyl sulfide). For maximum yield of the alkylthiomethylmetal compounds when these long chain alkyl sulfides are used, it is desired that there be no hydrogen atom attached to the β-carbon atom on the long alkyl group. When there is a β-hydrogen atom on the long alkyl group an elimination reaction occurs giving an α-olefin as a byproduct and consequently less alkylthiomethylmetal compound is formed.

There will normally be a stoichiometric amount, or an excess, of the alkyl methyl sulfide starting material relative to the metalating agent to prevent the excess metalating agent from interfering with subsequent reactions of the alkylthiomethyl-metal compounds.

METALATING AGENTS

Suitable alkyllithiums for use in the metalating complex and alkylsodiums and alkylpotassiums for use by themselves include those wherein the alkyl groups are methyl, ethyl, propyl, butyl, allyl, 3-dodecenyl, 8-tetradecenyl, pentyl, octyl, decyl, tetrapropylene, hexadecyl, dodecyl, octadecyl, or eicosyl groups. The unsaturated alkyl groups suitable for use in the metalating agents and in all of the reactants described hereinafter should not contain any "terminal unsaturation," i.e., the metal should not be bonded to any of the carbon atoms which comprise the center of unsaturation.

The alkyllithiums are preferably selected so that the point of attachment of the lithium is not a tertiary carbon atom since these tertiary alkyllithiums, e.g., t-butyllithium, are not readily activated by complexation with all diamines. For example, t-butyllithium will complex with diazabicyclo(2.2.2)octane. The alkylsodiums and alkylpotassiums are those that have the metal atom attached to a primary carbon atom, since the corresponding 2° and 3° organometallic compounds are difficult or impossible to prepare.

Suitable $R^1$ groups in the diamine compound of the metalating agent include methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, 2,4-hexadienyl, 2,4-dodecadienyl, 2,7-tetradecadienyl, 2,4,6-dodecatrienyl, allyl, 3-dodecenyl, 8-tetradecenyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups. The preferred $R^1$ groups are methyl and ethyl groups.

Suitable $R^2$ groups include methylene, ethylene, propylene, butylene, and pentylene groups. The preferred $R^2$ groups is an ethylene group and other preferred $R^2$ groups are methylene and propylene groups. Diamines with these $R^2$ groups are very effective complexing agents.

Examples of suitable diamine complexing agents include N-methyl, N-ethyl, N'-propyl, N'-butylpropylenediamine, N-dodecyl, N, N',N'-trimethylmethylenediamine, N-octyl, N,N',N'-triethylbutylenediamine, N,N,N',N'-tetraethylpropylenediamine, and N-eicosyl, N,N',N'-trimethylethylenediamine.

The preferred diamine complexing agents are N,N,N',N'-tetramethylethylenediamine and N,N,N',N'-tetraethylethylenediamine The ratio of the alkyllithiums to the diamine complexing agents is normally 1:1.

The metalation reaction and other subsequent reactions must take place in an inert atmosphere of, e.g., nitrogen, argon or helium, since the organometallic compounds are so reactive that they will be destroyed if exposed to a reactive atmosphere The temperature of the reaction can be any temperature at which the reaction mixture is liquid, e.g., any temperature above about −60° C. The preferred temperature is room temperature, e.g., (about 20° C.) preferably; the temperature is less than about 100° C. since the organometallic compounds tend to decompose above this temperature.

Although an excess of the short chain alkyl methyl sulfides can be used as a solvent, the metalating agents normally are sold commercially with an excess of liquid saturated hydrocarbons as a solvent and it is undesirable to remove this solvent so saturated hydrocarbons are conveniently used as a solvent. Suitable liquid saturated hydrocarbons which can be used as solvents include pentane, hexane, octane, isooctane, nonane, decane, isododecane, cyclohexane, etc. Saturated hydrocarbons containing from five to eight carbon atoms are preferred since they are easily removed by distillation. Liquid saturated hydrocarbons are used since they will not undergo reaction with the organometallic compounds.

REACTION WITH PHOSPHITES

The alkylthiomethylmetal compounds of this invention react with trialkyl or triaryl phosphites according to the following equation:

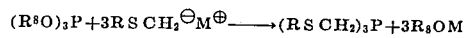

wherein each $R^8$ in the above equation is an alkyl, aryl, alkaryl or aralkyl hydrocarbon containing from one to 30 carbon atoms, there being no more than about 32 carbon atoms in the compound $(R^8O)_3P$ and $(RSCH_2)_3P$. The resulting products $(RSCH_2)_3P$ are new compounds. When these compounds are oxidized sequentially as follows the resulting new compounds are chelating agents.

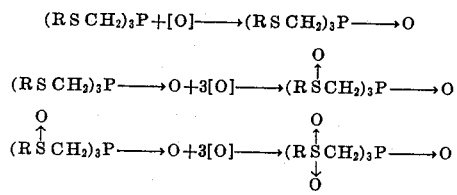

The oxidation steps produced sequentially. Mild oxidizing agents such as hydrogen peroxide can be used to oxidize the phosphines to the corresponding phosphine oxides and phosphine oxide-sulfoxides. The succeeding step in which the phosphine oxide-sulfoxide compounds are oxidized further to create the corresponding sulfones require much more stringent conditions, e.g., the use of strong oxidizing agents such as sodium or potassium hypochlorite.

The corresponding reaction wherein elemental sulfur replaces the oxygen in the initial reaction results in the corresponding phosphine sulfides as follows:

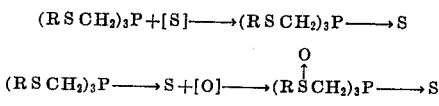

$R^8$ in the above formula for the phosphite reactant can be methyl, ethyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, isopropyl, butyl, isobutyl, decyl, dodecyl, hexadecyl, eicosyl, phenyl, benzyl, 4-dodecylphenyl, etc. The preferred $R^8$ group is phenyl.

The sulfide-phosphine sulfide, sulfoxide-phosphine sulfide, sulfide-phosphine oxide, sulfoxide-phosphine oxide, and sulfone-phosphine oxide compounds are good metal-chelating agents for heavy metal ions such as mercury, zinc, copper and nickel. These compounds are also effective additives for lubricants such as oils and greases to provide, e.g., good high-temperature and pressure characteristics. These compounds also have herbicidal activity. Where one of the R groups in the compound is a long chain containing from 12 to 24 carbon atoms and the other R groups are short-chain groups the resulting phosphine oxide and phosphine oxide-sulfoxide compounds are excellent surface-active agents useful for forming oil-in-water emulsions. The above compounds which contain two long alkyl chains are textile softeners for cotton when applied at a level of 1 percent by weight of the cloth in padding baths. Tris(methylthiomethyl)phosphine oxide kills oral bacteria, e.g., streptococci.

The oxidation steps can be carried out in air at temperatures of from 0° C. to about 100° C. Water can be used as a solvent and is preferred.

REACTION WITH ALKYL OR ARYL, HALO AND PSEUDOHALO PHOSPHINES

The alkylthiomethylmetal compounds of this invention react readily with trihalophosphines, haloalkylphosphines, and haloarylphosphines according to the following equation:

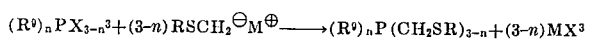

wherein each $R^9$ in the above equation is an alkyl, aryl, aralkyl, or alkaryl group containing one to 30 carbon atoms, one to 10 oxygen atoms as substituents replacing methylene groups in alkyl and alkylene groups, and zero to five substituent tertiary amino groups wherein $X^3$ is either a halogen atom, either chlorine, bromine, or iodine or a pseudohalogen group such as $R''O-$, $-NR_2''$ and $-SO_4R''$, wherein $R''$ is selected from the group consisting of alkyl, aryl, alkaryl and aralkyl groups containing from one to 30 carbon atoms, from zero to 10 substituent oxygen atoms replacing methylene groups in alkyl and alkylene groups and from zero to five substituent tertiary amino groups, and wherein $n$ is either zero, 1 or 2. These compounds will undergo several reactions. For example, the compounds can be oxidized stepwise as described hereinbefore to the following compounds.

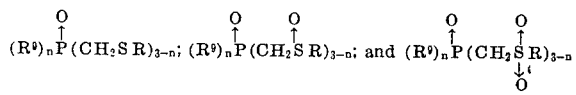

$R^9$ in the above formulas and equations is preferably either a phenyl group or an alkyl chain containing from one to 20 carbon atoms. Examples of these groups are: methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, isopropyl, butyl, 2-butenyl, hexyl, octyl, decyl, tetrapropylene, dodecyl, tridecyl, tetradecyl, hexadecyl, octadecyl, eicosyl, and 2-octadecenyl groups.

$R^9$ can be an aryl group (e.g., phenyl, biphenyl, or naphthyl groups); an alkaryl group (4-decylphenyl, 4-methyl-1-naphthyl, ethyldiphenyl, 2-methylphenyl, etc.); or an aralkyl group [benzyl, 12-phenyldodecyl 1-naphthylmethyl, 2-(4-biphenyl)-ethyl, etc.] These groups are also preferred. Suitable substituted $R^9$ groups include 4-methoxyphenyl, 3,6,9,12-tetraoxaoctadecyl, 3,6,di(dimethylamino)hexyl, and 3-diethylaminopropyl groups.

The preferred $X^3$ is chlorine.

The products of the reactions of alkylthiomethylmetal compounds with the phosphites and halophosphines and the oxidized and/or sulfurized analogs of said products have the generic formula:

$$PQ_y[-CH_2S(\rightarrow O)_zR]_{L (R^9)_3-L}$$

wherein $y$ is 0 or 1, Q is ($\rightarrow$O) or ($\rightarrow$S), each $z$ is 0, 1 or 2, when Q is ($\rightarrow$O), 0 or 1 when Q is ($\rightarrow$S) and 0 when $y$ is 0, L is an integer from one to three, and R and $R^9$ have the definitions given hereinbefore.

The compounds which contain phosphine oxide moieties are surface-active agents useful for forming oil in water emulsions when one of the R groups contains about eight to about 24 carbon atoms and the other R groups are short alkyl groups. All of these compounds have herbicidal characteristics and are lubricant additives as discussed hereinbefore. When there are two long alkyl groups of from 12 to 24 carbon atoms in these compounds they are textile softeners for cotton when used at a level of about 1 percent by weight of the cloth and applied in a padding bath.

All of the above compounds which contain sulfide groups and phosphine groups can be converted to phosphonium compounds with a conventional organic halide or pseudohalide $R^6X^2$ as hereinbefore described according to the following equation:

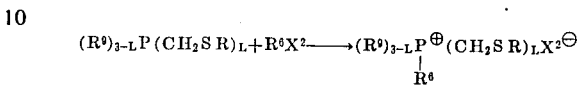

When these phosphonium compounds contain one long alkyl chain of from about eight to about 14 carbon atoms they are effective surface-active agents. When the compounds contain two long alkyl chains of from 16 to about 24 carbon atoms these compounds are substantive textile softeners.

The phosphonium compounds can be reacted with, e.g., sodium hydroxide according to the disclosure in the copending application of Hays, Ser. No. 329,281, filed Dec. 9, 1963, to form the phosphine oxide compounds described hereinbefore which contain sulfide groups.

All parts, percentages and ratios herein are by weight unless otherwise specified. The following examples are illustrative of the invention and should not be taken as limiting the scope of the claims.

EXAMPLE I

PREPARATION OF METHYLTHIOMETHYLLITHIUM 5.8 gm. (0.05 mole) of N,N,N',N'-tetramethylethylenediamine (TMEDA) was added to 36 ml. of 1.4 molar (0.05) n-butyllithium in hexane to form 0.05 mole of the n-butyllithium-TMEDA complex. (The temperature in these reactions was held below about 20° C. by means of a water bath.) 3.1 g. (0.05 mole) of dimethyl sulfide was added to the complex and after about a quarter of an hour a white precipitate had formed. This precipitate was composed of lithium methyl mercaptide and methylthiomethyllithium. After about 4 hours, the resulting reaction mixture containing the methylthiomethyllithium (MTML) was used in the following reactions. All reactions herein (Including examples II–XVI) were carried out in an inert atmosphere of nitrogen.

When in the above example the following alkyl methyl sulfides are substituted on a molar basis for the dimethyl sulfide, substantially equivalent results are obtained in that the corresponding alkylthiomethyllithium compounds are prepared: methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, b-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, cyclooctyl, phenyl, biphenyl, naphthyl, 3-phenyldodecyl, 4-methyldecyl, 4-phenyloctyl, 4-decyl, 4-phenylbutyl, 3-methyldecyl, 3-(1-naphthyl)propyl, 4-(1-naphthyl)butyl, 3-ethyl,3-(4-biphenyl)propyl, and 3-(4-biphenyl)propyl methyl sulfides.

When in the above examples the following metalating agents are substituted on a molar basis for n-butyllithium-TMEDA complex substantially equivalent results are obtained in that the alkylthiomethylmetal compounds are prepared: phenylsodium; phenylpotassium; methyl, ethyl propyl, butyl, pentyl, octyl, decyl, tetrapropylene, hexadecyl, dodecyl, octadecyl, and eicosyl sodiums and postassiums; the complexes of methyl, ethyl, propyl, butyl, pentyl, octyl, decyl, tetrapropylene, hexadecyl, dodecyl, octadecyl and eicosyl lithiums with N-methyl, N-ethyl,N'-propyl, N'-butylpropylenediamine, N-dodecyl, N,N',N'-trimethylmethylenediamine, N-octyl, N,N',N'-triethylbutylenediamine, N,N,N',N'-tetraethylpropylenediamine, or N-eicosyl, N,N',N'-trimethylethylenediamine or t-butyllithium with diazabicyclo(2.2.2.)-octane.

When in the above examples the following saturated hydrocarbons are substituted, either wholly or in part (e.g., 1:1 mixtures), for the hexane, substantially equivalent results are obtained in that the alkylthiomethylmetal compounds are prepared; pentane, octane, isooctane, nonane, decane, isododecane, and cyclohexane.

EXAMPLE II

REACTION OF CHLORODIPHENYLPHOSPHINE WITH METHYLTHIOMETHYLLITHIUM 0.2 mole of the filtrate of example I was added dropwise over a period of 1 hour to a solution of 44 c. (0.2 mole) of chlorodiphenylphosphine in 100 ml. of tetrahydrofuran. The mixture was stirred for an additional 2 hours and the reaction mixture was carefully hydrolyzed with 100 ml. of 2.5 molar ammonium chloride. The organic layer was dried, concentrated and distilled under reduced pressure to give 24.4 g. of (methylthiomethyl) iphenylphosphine, b.p. 160°–165° C. (0.5 mm.). The product gave rise to a $P^{31}$ nmr signal at +21 p.p.m. in $CHCl_3$ and $H^1$ nmr signals centered at τ2.8 (aromatic), 7.08 (methylene, doublet, J=3c.p.s.), and 8.02 (methyl, singlet) in the correct area ratios.

When in the above examples the following halo, halo alkyl or aryl phosphines are substituted on a molar basis for the chlorodiphenylphosphine; substantially equivalent results are obtained in that the corresponding (methylthiomethyl)alkyl or aryl phosphines are prepared: phosphorus trichloride, phenylmethylchlorophosphine, diallylbromophosphine, dimethylchlorophosphine, dodecylmethylchlorophosphine, dimethyliadosphine, dodecyldichlorophosphine, hexadecyldibromophosphine, (2-octadecynyl)-1-naphthylchlorophosphine, 4-biphenylisopropylchlorophosphine, 3,6,9,12tetraoxaoctadecylmethylbromophosphine, 4-methoxyphenyldichlorophosphine and (3-diethylaminopropyl)phenylchlorophosphine.

When in the above examples any of the alkylthiomethyl alkali metals of example I are substituted for the methylthiomethyllithium a molar basis, substantially equivalent results are obtained in that the corresponding (alkylthiomethyl)alkyl or aryl phosphines are prepared.

These products are all useful as lubricant additives, herbicides, and intermediates in the preparation of other compounds as described in detail both hereinbefore and hereinafter.

EXAMPLE III

QUATERNIZATION OF (METHYLTHIOMETHYL)DIPHENYLPHOSPHINE

Treatment of 1.5 ml. of the (methylthiomethyl)-diphenylphosphine with an excess of methyl iodide in 20 ml. of acetone gave 2.45 g. of diphenylmethyl(methylthiomethyl)-phosphonium iodide, m.p. 161.5°–163.5° C. The nmr analysis in $CDCl_3$ was: $H^1$ signals centered at τ2.18 (aromatic), 5.27 (methylene, doublet, J=8 cps.), 7.07 (≡PCH_3, doublet, J=13 c.p.s.), and 7.71 (—SCH_3, singlet).

When in the above reaction any of the other phosphine reaction products of example II are substituted on a molar basis for the (methylthiomethyl)diphenylphosphine, substantially equivalent results are obtained in that the corresponding phosphonium iodides are prepared.

When in the above reaction the following alkyl halides are substituted on a molar basis for the methyl iodide, substantially equivalent results are obtained in that the corresponding phosphonium salts are prepared: ethyl; allyl; isopropyl; tetrapropylene; dodecyl; 2-dodecynyl; 2,4-dodecadiynyl; 2,4-dodecadienyl;benzyl; 1-naphthylmethyl; (2-biphenyl)-2-ethyl; 4-methoxybenzyl; 3,6,9,12-tetraoxaoctyl; and 3-diethylaminopropyl chlorides, bromides, iodides and methyl sulfates.

EXAMPLE IV

SULFURIZATION OF (METHYLTHIOMETHYL)DIPHENYLPHOSPHINE 0.05 mole of the filtrate of example I was added dropwise to 15 g. (0.07 mole) of chlorodiphenylphosphine in 15 ml. of tetrahydrofuran, as in example II. The reaction was quite exothermic. The mixture was then stirred for about one hour and 1.9 g. (0.06 mole) of sulfur was added in four parts over a one-half hour period. The mixture was stirred for another one-half hour and then added to a chilled solution of 0.2 mole of $NH_4Cl$ in 150 ml. of water. The organic layer was separated and combined with an ether extract of the aqueous layer. The product, a viscous oil, was further purified by chromatography on alumina, and crystallization from benzene to give 6.98 g. of (methylthiomethyl diphenylphosphine sulfide, m.p. 43—45° C. Gas chromatography showed that the compound was pure. The nmr analysis showed: aromatic protons centered at τ2.4, methylene protons at τ6.61 (doublet, J=8 c.p.s.), and methyl protons at τ7.95 (singlet) in the correct area ratios. Continued elution of the column with chloroform and methanol gave glassy materials.

When in the above example any of the phosphine reaction products of example II are substituted on a molar basis for the (methylthiomethyl diphenylphosphine the corresponding sulfides are prepared.

When in the above example the sulfide products are reacted with excess 30 percent aqueous hydrogen peroxide the corresponding sufloxide-phoshpine sulfides are formed, e.g., (methylsulfinylmethyl diphenylphosphine sulfide.

All of the above products are herbicides lubricant additives, surface-active agents, and chelating agents for heavy metal ions as hereinbefore discussed.

EXAMPLE V

REACTION OF MTML WITH TRIMETHYLPHOSPHITE

Over a period of about a quarter of an hour 0.2 mole of MTML as prepared in example I was added to 6.2 g. (0.05 mole) of trimethylphosphite dissolved in 100 ml. of tetrahydrofuran. The reaction was mildly exothermic. The mixture was then heated at gentle reflux for 1 hour. The reaction mixture was then hydrolyzed with 200 ml. of 1.5 molar ammonium chloride and the organic layer was separated, dried over sodium sulfate, concentrated, and separated by gas phase chromatography to give tris(methylthiomethyl)phosphine, b.p. 110° at 0.1 mm. Spectral analysis by $H^1$ nmr gave signals centered at τ7.27 (methylene, doublet, J=4 c.p.s.), and τ7.80 (methyl, singlet) in the correct area ratios.

When in the above example the following alkyl and aryl phosphites are substituted on a molar basis for the trimethylphosphite substantially equivalent results are obtained in that the corresponding alkylthiomethylphosphines are prepared: ethylphenylallylphosphite; triethylphosphite; tributylphosphite; naphthyldodecyl(2,4-dodecadiynyl)phosphite; biphenylbenzylbutylphosphite; and triisopropylphosphite.

EXAMPLES VI 0.3 mole of MTML as prepared in example I was added to 31 g. (0.1 mole) of triphenylphosphite in 100 ml. of tetrahydrofuran over a period of about one-half of an hour. The reaction mixture was then heated at gentle reflux for 2 hours and then stirred overnight at room temperature. Purification of the reaction mixture gave 11.2 grams of tris(methylthiomethyl)-phosphine, the same product prepared in example IX.

EXAMPLE VII

OXIDATION OF TRIS(METHYLTHIOMETHYL)PHOSPHINE 45 ml. (approximately 0.06 mole) of 30 percent hydrogen peroxide was added dropwise to a solution of 10.4 g. (0.049 mole) of tris(methylthiomethyl)phosphine dissolved in 30 ml. of acetone. A vigorous reaction resulted as evidenced by the evolution of heat. The oxidation of the phosphine compound was monitored by gas phase chromatography. After the reaction was completed the mixture was concentrated to give a solid contaminated with water. The water was removed by azeotroping with benzene. The dry residue melted over the range of 87°–90° C. Two crystallizations from benzene/hexane solvent mixtures gave 8.4 grams of a compound having a melting point of 90°–92° C. The compound was tris(methylthiomethyl)phosphine oxide.

When the tris(methylthiomethyl)phosphine oxide is reacted with excess 30 percent aqueous hydrogen perioxide the product is tris(methylsulfinylmethyl)phosphine oxide.

When the tris(methylsulfinylmethyl)phosphine oxide is reacted with excess 4 percent aqueous sodium hypochlorite the product is tris(methylsulfonylmethyl)phosphine oxide.

When in the above example the corresponding (alkylthiomethyl)alkyl or aryl phosphines of example II are substituted on a molar basis for the tris(methylthiomethyl)phosphine, substantially equivalent results are obtained in that the corresponding (alkylthiomethyl)alkyl or aryl phosphine oxides; (alkylsulfinylmethyl)alkyl or aryl phosphine oxides; and (alkylsulfonylmethyl)alkyl or aryl phosphine oxides are formed.

These products are all useful lubricant additives, chelating agents for heavy metal ions, herbicides, and surface-active agents as hereinbefore described.

EXAMPLE VIII

When in previous examples II, IV, V, and VI the following solvents are substituted, either wholly or in part (e.g., 1:1 mixture), for the tetrahydrofuran, substantially equivalent results are obtained in that the reaction proceeds without interference: pentane; hexane; octane; isooctane; nonane; decane; isododecane; cyclohexane; diethyl ether; dibutyl ether; diphenyl ether; 1,2-dimethoxyethane; and diethylene glycol dimethyl ether.

EXAMPLE IX

When in any of the previous examples II, V and VI any of the alkylthiomethylmetal compounds of example I are substituted for the methylthiomethyllithium or n-decylthiomethyl lithium compounds, substantially equivalent results are obtained in that analogous compounds are prepared.

EXAMPLE X

The detergent compounds of this invention can be used to formulate detergent compositions having the following formulas:

Spray-dried granular detergent

|  | Percent |
| --- | --- |
| Detergent compounds of this application | 17.5 |
| Sodium sulfate | 23 |
| Sodium tripolyphosphate | 50 |
| Sodium silicate | 6 |
| Water | 3.5 |

Granular detergent

| | |
| --- | --- |
| Detergent compounds of this application | 10 |
| Sodium dodecylbenzenesulfonate (the dodecyl group being derived from tetrapropylene) | 10 |
| Sodium nitrilo triacetate | 50 |
| Sodium sulfate | 30 |

Granular detergent

| | |
| --- | --- |
| Detergent compounds of this application | 10 |
| Condensation product of one mole of nonyl phenol and nine moles of ethylene oxide | 10 |
| Sodium pyrophosphate | 50 |
| Sodium carbonate | 3 |
| Trisodium phosphate | 3 |
| Sodium sulfate | 24 |

Milled toilet bar

| | |
| --- | --- |
| Detergent compounds of this application | 10 |
| Sodium coconut oil soap | 15 |
| Sodium tallow soap | 65 |
| Moisture | 10 |

Milled toilet bar

| | |
| --- | --- |
| Detergent compounds of this application | 50 |
| Tallow fatty acid | 25 |
| Moisture | 15 |
| Cornstarch | 5 |
| Triethanolammonium ethylenediaminetetraacetate | 5 |

Scouring cleanser

| | |
| --- | --- |
| Silica flour | 85 |
| Detergent consisting of 85% trisodium phosphate and 15% of the detergent compounds of this application | 15 |

Liquid detergent

| | |
| --- | --- |
| Sodium dodecyl benzene sulfonate | 6 |
| Detergent compounds of this application | 6 |
| Potassium pyrophosphate | 20 |
| Potassium toluene sulfonate | 8 |
| Sodium silicate | 3.8 |
| Carboxymethyl hydroxyethyl cellulose | 0.3 |
| Water | Balance |

Liquid detergent

| | |
| --- | --- |
| Detergent compounds of this application | 10 |
| Tetrasodium ethylenediaminetetraacetate | 25 |
| Water | 65 |

Examples of detergent compounds of this application include sodium, potassium, and ammonium decyl, dodecyl, and tetradecyl thioacetates; dodecylbis(methylthioethyl)phosphine oxide; octadecyl(ethylsulfinylmethyl)methylphosphine oxide; (tetradecylthiomethyl)dimethylphosphine oxide; and (octadecylsulfonylmethyl)diethylphosphine oxide. Other detergents disclosed herein and especially those of examples III, IV and VII, can be substituted for the above examples to give substantially equivalent results in that the compositions have detergent properties. These detergent compositions are used according to the teachings of the prior art with respect to similar detergent compositions.

EXAMPLE XI

A 0.1 percent solution of tris(methylthiomethyl)phosphine oxide in water was used to kill the following oral bacteria: fusobacteria, streptococci, ceria, nisseria and nocardia. The solution had excellent bactericidal properties.

What is claimed is:

1. Compounds having the formula $$PQ_y[-CH_2S(\rightarrow O)_zR]_L(R^9)_{3-L}$$

Wherein Q is selected from the group consisting of ($\rightarrow$O) and (-S), y is an integer which is 0 or 1, wherein each R is a saturated alkyl group containing from one to 30 carbon atoms, from zero to 10 substituent oxygen atoms replacing methylene groups in alkyl and alkylene groups, from zero to 2 substituents selected from the group consisting of aryl groups, alkaryl groups, and tertiary amino groups, said substituents being placed so that no aryl moiety, oxygen atom or nitrogen atom is attached to any carbon atom which is less than three atoms removed from the sulfur atom, wherein L is an integer from 1 to 3, wherein each z is an integer which is 0, 1, or 2, when Q is ($\rightarrow$O), 0 or 1 when Q is ($\rightarrow$S), and 0 when y is 0, and wherein each $R^9$ is selected from the group consisting of alkyl, aryl, aralkyl, and alkaryl groups containing from one to 30 carbon atoms, one to 10 oxygen atoms as substituents replacing methylene groups in alkyl and alkylene groups and zero to five substituent tertiary amino groups.

2. The compounds of claim 1 wherein L is 3 and R is an alkyl group containing from one to about 20 carbon atoms.

3. The compounds of claim 1 wherein L is an integer less than 3 and $R^9$ is selected from the group consisting of a phenyl group and an alkyl group containing from one to 20 carbon atoms.

4. The process of preparing phosphine compounds containing thioether linkages according to claim 1 which comprises the step of reacting alkylthiomethylmetal compounds having the formula $$RSCH_2M$$

wherein R is a saturated alkyl group containing from one to 30 carbon atoms, from zero to 10 substituent oxygen atoms replacing methylene groups in alkyl and alkylene groups, from zero to two substituents selected from the group consisting of aryl groups, alkaryl groups, and tertiary amino groups, said substituents being placed so that no aryl moiety, oxygen atom or nitrogen atom is attached to any carbon atom which is less than three atoms removed from the sulfur atom and wherein M is an alkali metal selected from the group consisting of lithium, sodium and potassium with phosphites having the formula $$(R^8O)_3P$$

wherein each $R^8$ in the phosphite compound is selected from the group consisting of alkyl, aryl, alkaryl and aralkyl groups containing from one to 30 carbon atoms there being no more than about 32 carbon atoms in said compound or in the product of the reaction which is a compound having the formula $$(RSCH_2)_3P$$

wherein R has the same definition as given hereinbefore.

5. The process of claim 4 wherein $R^8$ is selected from the group consisting of a phenyl group and an alkyl group containing from one to 30 carbon atoms and R is an alkyl group containing from one to 30 carbon atoms.

6. The process of preparing phosphine compounds containing thioether linkages according to claim 1 which comprises the step of reacting an alkylthiomethylmetal compound having the formula $$RSCH_2M$$

wherein R is a saturated alkyl radical containing from one to 30 carbon atoms, from zero to 10 substituent oxygen atoms replacing methylene groups in alkyl and alkylene groups, from zero to two substituents selected from the group consisting of aryl groups, alkaryl groups, and tertiary amino groups, said substituents being placed so that no aryl moiety, oxygen atom or nitrogen atom is attached to any carbon atom which is less than three atoms removed from the sulfur atom and wherein M is an alkali metal selected from the group consisting of lithium, sodium and potassium with a phosphine compound having the formula $$(R^9)_nPX_{3-n}^3$$

wherein each $R^9$ in the above equation is selected from the group consisting of alkyl, aryl, alkaryl and aralkyl groups containing from one to 30 carbon atoms, one to 10 oxygen atoms as substituents for methylene groups in alkyl and alkylene groups, and one to five substituent tertiary amino groups, wherein $X^3$ is selected from the group consisting of chlorine, bromine and iodine atoms, alkyl groups having the formula $R^{11}O-$, amino groups having the formula $NR_2^{11}$, and alkyl sulfate anion groups having the formula $R^{11}SO_4-$, wherein $R^{11}$ is selected from the group consisting of alkyl, aryl, alkaryl and aralkyl groups containing from one to 30 carbon atoms, from zero to 10 substituent oxygen atoms replacing methylene groups in alkyl and alkylene groups and from zero to five substituent tertiary amino groups and wherein n is 0, 1 or 2.

7. The process of claim 6 wherein $R^9$ is selected from the group consisting of a phenyl group and alkyl groups containing from one to 20 carbon atoms, R is an alkyl group containing from one to 20 carbon atoms and $X^3$ is a chlorine atom.

* * * * *

PO-1050
(5/69)

UNITED STATES PATENT OFFICE
CERTIFICATE OF CORRECTION

Patent No. 3,624,260   Dated February 8, 1972

Inventor(s) Donald J. Peterson

It is certified that error appears in the above-identified patent and that said Letters Patent are hereby corrected as shown below:

In the Abstract, line 1, before Alkylthiomethylmetal, insert (1).

Column 3, line 48, "N, N',N'-trimethylenediamine" should read -- N,N',N'-trimethylenediamine --.

Column 4, line 13, after the arrow "$(RSCH_2)_3P+3R_8OM$" should read -- $(RSCH_2)_3P+3R^8OM$ --.

Column 6, line 54, "b-dodecyl" should read -- n-dodecyl --.

Column 7, line 16, "44 c." should read -- 44 g. --.

Column 7, line 22, "(methylthiomethyl)iphenylphosphine" should read -- (methylthiomethyl)diphenylphosphine --.

Column 8, line 18, "(methylthiomethyl diphenylphosphine" should read -- (methylthiomethyl)diphenylphosphine --.

Column 8, line 28, "(methylthiomethyl diphenylphosphine" should read -- (methylthiomethyl)diphenylphosphine --.

Column 8, line 33, "phoshpine" should read -- phosphine --.

Column 8, line 34, "(methylsulfinylmethyldiphenylphosphine" should read -- (methylsulfinylmethyl)diphenylphosphine --.

Column 11, line 3, "( S)" should read -- (→S) --.

Column 12, line 28, "$(R^9)_nPX_3^{-3}{}_n$" should read -- $(R^9)_nPX_{3-n}^3$ --.

Column 12, line 33, "one" should read -- zero --.

Signed and sealed this 6th day of June 1972.

(SEAL)
Attest:

EDWARD M. FLETCHER, JR.
Attesting Officer

ROBERT GOTTSCHALK
Commissioner of Patents